C. NATTERSTAD.
SPRING WHEEL.
APPLICATION FILED APR. 22, 1916.

1,246,307.

Patented Nov. 13, 1917.

Inventor
Charles Natterstad.
By Henry L. Reynolds
his attorney.

UNITED STATES PATENT OFFICE.

CHARLES NATTERSTAD, OF KIRKLAND, WASHINGTON.

SPRING-WHEEL.

1,246,307.  Specification of Letters Patent.  Patented Nov. 13, 1917.

Application filed April 22, 1916. Serial No. 92,991.

*To all whom it may concern:*

Be it known that I, CHARLES NATTERSTAD, a citizen of the United States, residing at Kirkland, in the county of King and State of Washington, have invented new and useful Improvements in Spring-Wheels, of which the following is a specification.

My invention relates to a resilient tire construction for wheels in which the resiliency is secured by the use of springs. The chief object of my invention is to produce a rim or tire structure for wheels utilizing the springs in such manner as to eliminate the troubles arising from punctures in pneumatic tires.

My invention comprises the parts and combinations of parts which will be hereinafter described and then particularly pointed out in the claims. In the accompanying drawings I have illustrated my invention in the form of construction which is now most preferred by me.

In carrying out my invention I first provide a central rigid wheel structure which has an outer felly J which may, in its general features, be of any suitable construction. The special features of my invention reside in the rim or tire which is placed upon this central structure.

This outer rim or tire structure employs two rings, A and B, of which the inner ring B is of a size to fit snugly upon the central wheel structure, and the outer ring A is of such size as to be spaced a considerable distance from the inner ring B. These rings, A and B, are preferably of flat metal, and the outer ring A should also be of spring or resilient material, so that it will yield and bend under pressure.

Between the two rings, A and B, are placed a series of springs, these being arranged in pairs. The spring D of each pair, is composed of flat metal which may be of a single or a plurality of leaves and is bent into a rather high or arch-like shape. The central portion of this spring is fixedly secured to the outer ring A, as by a rivet or bolt, at G. The ends of this spring extend inwardly to such a distance as to reach the inner ring B.

Figure 1:
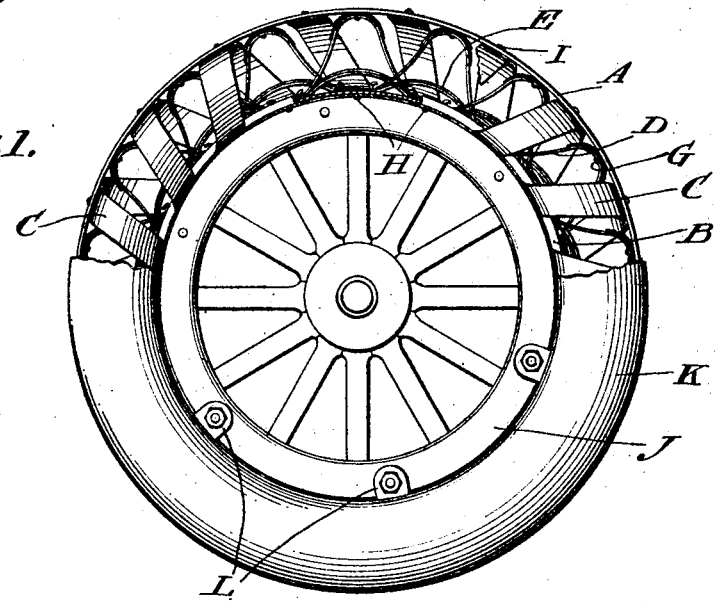
Figure 1 is a side view of a wheel having my invention embodied therein, in which the tire covering and certain of the outer layers of springs have been removed in order to better show the interior construction.
Figure 2:
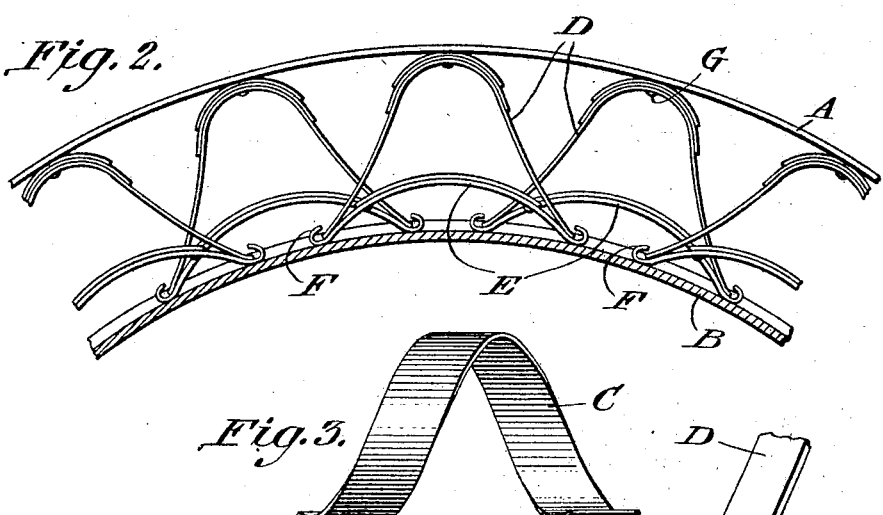
Fig. 2 is a side elevation of a section of the rim structure containing the springs from which the outer helical springs have been omitted.
Figure 3:
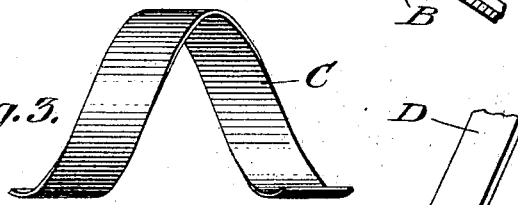
Fig. 3 is a separate view of one of the outer helical springs.
Figure 4:
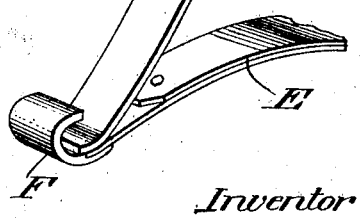
Fig. 4 is a perspective showing the manner of joining the ends of the pairs of springs which are placed between the outer and inner rings.

The other spring E of the pair is a flat or leaf spring of analogous structure but with a much lower arch or crown. Its ends are turned up to form a hook or loop, or it has a hook member, as F, see Fig. 4, secured to each of its ends. The ends of the springs D are seated in these hooks or sockets F. Weight applied to the springs, tending to depress the crowns of springs D, will cause their ends to separate and slide outwardly. This tendency is resisted by the springs E as soon as the ends of the springs D become seated in their terminal hooks F. This brings the resiliency of the springs E in play and adds a material sustaining force.

In conjunction with the springs described, helical springs C are employed. They are composed of flat metal which is coiled into helical shape, each spring being long enough to make one complete turn. The ends of these springs are secured to the inner ring B, preferably overlapping the inner surface thereof. These are secured by rivets or bolts, as H. The center of each of these springs bears against the inner surface of the outer ring A and is secured thereto by a bolt or rivet I. Outside of the whole is placed a casing K, which may be of leather, canvas, or any suitable material. The inner ring B may be provided with lugs, as L, which overlap the side surface of the inner rigid wheel, and may be secured thereto by bolts or otherwise.

The inner ring B is preferably made as a shallow channel, the flanges at the edges thereof projecting but a slight distance and yet sufficient to restrain the ends of the springs D and E and prevent their being displaced laterally a sufficient distance to pass off of the inner ring. The springs D and E are preferably placed in two rows alongside of each other, and the springs of the rows placed so that those in one row are opposite the spaces of those in the other row, thus forming two staggered rows of springs.

The tire above described will not be affected by punctures and it will give no inconvenience in the road way. The springs are all of a type of construction which may be manufacturd cheaply and easily replaced if any of them become broken.

What I claim as my invention is:

1. In a spring wheel, in combination, inner and outer ring members spaced apart, arch shaped springs each secured by the crown of the arch to one of these rings and having its ends extending to the other ring, and springs of flatter arch each provided with means for engaging the ends of the other spring to prevent over separation of its ends under weight.

2. In a spring wheel, in combination, inner and outer ring members spaced apart, arch shaped springs each secured by the crown of the arch to one of these rings and having its ends extending to the other ring, and springs of flatter arch each having its ends upturned to provide seats for the ends of the other spring.

3. A wheel structure as defined by claim 1, having in combination therewith a sectional helical spring extending about the arch-shaped springs and around the periphery of the wheel between the inner and outer rings.

In testimony whereof, I affix my signature hereto in the presence of two witnesses.

CHARLES NATTERSTAD.

Witnesses:
C. L. BUTCHER,
R. F. CHAUSSER.